Oct. 25, 1938.　　　　M. WOLKIN　　　　2,134,271
YARN MEASURING DEVICE
Filed May 24, 1937
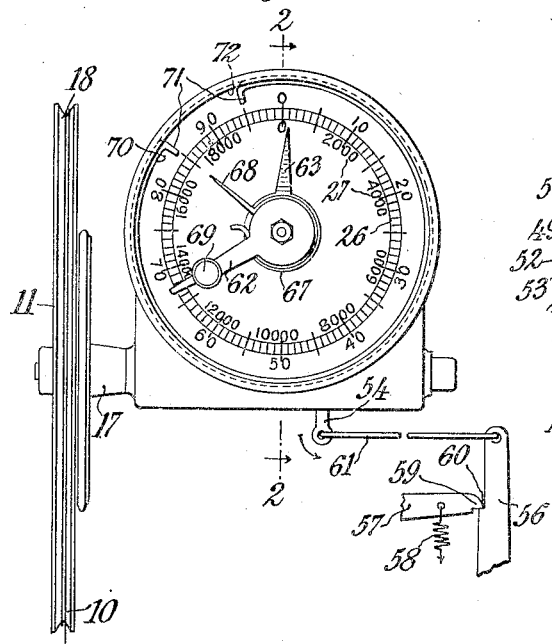
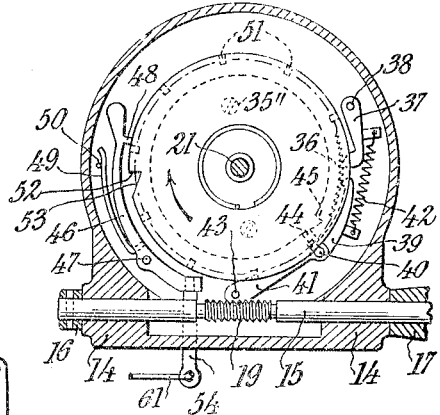
INVENTOR
Morris Wolkin
BY
A. Engel
ATTORNEY Patented Oct. 25, 1938

2,134,271

UNITED STATES PATENT OFFICE 2,134,271

YARN MEASURING DEVICE

Morris Wolkin, New York, N. Y.

Application May 24, 1937, Serial No. 144,490

2 Claims. (Cl. 235—132)

My present invention relates to a yarn measuring and stop device and constitutes an improvement upon the type of device disclosed in United States patent to Brink No. 1,286,927, issued December 10, 1918.

In the device of said above designated patent and other devices embodying the same principle, the yarn is measured by being caused to engage over and rotate a measuring wheel, the shaft of which is formed with a worm which engages and drives a gear, the number of teeth on which is definitely related to the size of the measuring wheel and usually such that two revolutions of the wheel which has a circumference of one-half yard will advance the gear one tooth. In other words, rotation of the gear one tooth will represent one measured yard. To visually indicate the amount of yarn that has passed over the measuring wheel the gear is mounted to rotate on a shaft which carries a pointer movable over a dial calibrated in yards so that where the gear is formed with two hundred teeth, one complete revolution of the pointer will represent two hundred yards of measured off yarn. Frictionally driven by the gear is a disk which is fast on the shaft, and said disk is formed with a single tooth for cooperative engagement with a lever and pawl device for advancing a rotatable ratchet one tooth each time the disk makes a complete revolution. The ratchet is usually formed with the same number of teeth as there are graduations on the dial and carries a second pointer which is movable over the dial. Hence for each complete revolution of the first pointer the second pointer will move but one division so that if the dial is divided into one hundred equal divisions a complete revolution of the second pointer will indicate 200×100 or 20,000 yards. The device is also provided with a stop control mechanism for stopping the winding machine when a predetermined yardage has passed over the measuring wheel. This stop control mechanism comprises a supplemental disk having a peripheral notch therein carried by the rotatable ratchet, a single notch in the disk carried by the gear and a lever having a part adapted to ride over the peripheries of said disks and engage in the notches therein when they come into juxtaposition and thereupon operate the mechanism to stop the machine to which the measuring device is attached. To again measure off the same or any other amount of yarn, the pointer carried by the ratchet must be reset to the point on the dial indicating the yardage to be measured off and the machine again started. This resetting of the pointer usually requires that it be turned by hand almost completely around the dial when the amount to be measured off is less than one thousand yards and a proportional lesser angular degree when the quantity to be measured off exceeds one thousand yards. This resetting is not only time consuming but also entails additional wear on the indicator parts, particularly the rotatable ratchet and its pawls and also gives rise to a source of error in resetting the pointer at the desired subdivision of the dial.

According to my present invention I provide means for eliminating the resetting of the device when it is desired to repeatedly measure off the same amount of yarn. To accomplish this instead of the ratchet carrying disk being formed with a single notch as in prior devices, the periphery of the ratchet carrying disk is formed with a plurality of equally spaced notches depending on the yardage to be measured, it being remembered that one complete revolution of the ratchet represents a measurement of twenty thousand yards. The invention also contemplates providing a group of such disks with different numbers of uniformly spaced notches where different desirable yardage amounts are to be repeatedly measured off and to have such disks readily interchangeable on the ratchet wheel. The invention will be better understood from a detailed description which follows when considered in connection with the accompanying drawing, wherein:

Figure 1 is a front view of a yarn measuring device embodying my invention, showing it connected with a stop control mechanism for the machine with which it is used.

Fig. 2 is a section taken substantially along the plane of the line 2—2 of Fig. 1 looking in the direction indicated by the arrows.

Fig. 3 is a vertical sectional view taken substantially along the plane of the line 3—3 of Fig. 2 looking in the direction indicated by the arrows.

Fig. 4 is an edge view of the mechanism shown in Fig. 3 when viewed from the left thereof, the casing being omitted.

Fig. 5 is a plan view of a notched disk constituting a feature of my invention separated from its cooperating parts.

Referring to the drawing, the device illustrated is intended for measuring yarn or the like 10 which in the course of being measured passes over a measuring wheel 11 to rotate the same. The wheel 11 drives the measuring mechanism which is enclosed in a casing 12 adapted to be mounted on a bracket or attached directly to the machine with which the device is to be used. Preferably the casing 12 is of substantially cylindrical form and is provided with a depending trough-like portion 13 which serves as an oil reservoir for the operating parts contained therein. The depending portion of the casing is formed with end bearings 14 which support a horizontal shaft 15 which is held in place by a collar 16 secured thereto at one end by a pin and at its other end by a hub 17 formed on the measuring wheel 11. At its periphery the measuring wheel is preferably formed with a V-shaped groove 18 adapted to receive the yarn 10 which is usually given two or more turns around its circumference to provide traction for the wheel. Intermediate its ends the shaft 15 is formed with a screw thread or worm 19 and meshing with said worm is a worm wheel or gear 20 which serves as the main driving element of the device. The gear 20 is mounted free to turn on a shaft 21 which extends axially through the casing with its rearward end rotatably mounted in a hub 22 on the rear wall of the casing. On its forward end, the shaft 21 is fitted with a collar or bushing 23 mounted to turn freely in its bearing in a plate 24 which is suitably held within the casing. Secured to the front of the plate 24 is a dial 25 on the front of which are the index graduations 26 and numerals 27 for indicating the yardage measured by the device.

At a point intermediate its ends the shaft 21 is knurled as indicated at 28 and force-fitted on this knurled portion so as to be rotatable with the shaft is a disk 29. Riveted to the rear face of the disk 29 is an annular flat plate or disk 30 adapted to bear against the front face of the gear 20 and serve to hold the latter against the inner end of the hub 22. The inner periphery of the annular plate 30 is formed with a shallow groove within which is seated a wire spring 32 having one of its ends 33 bent at a right angle and engaging through a hole in the gear 20. The wire spring 32 acts as a friction clutch to cause the disk 29 to be driven from the gear 20 while also allowing it to be turned in one direction free of the gear.

Force-fitted onto the reduced inner end of the bushing 23 is a ratchet disk 34 and detachably secured to the back of said ratchet disk is an annular flat plate or disk 35 of the same diameter as the annular plate 30 on the disk 29. Preferably the plate 35 has openings 35' therein through which fastening screws 35'' extend into the ratchet disk 34, which is formed on its periphery with ratchet teeth 36 adapted to be engaged by the pointed end of a pawl 37 pivoted on a pin 38 carried by the plate 24. The pawl 37 acts to restrain the ratchet disk 34 from rearward rotation while allowing it to be turned in the direction indicated by the arrow in Fig. 3. The ratchet disk 34 is driven with a step-by-step motion by means of a hooked pawl 39 which is pivoted at 40 on the end of an arm 41. A coil spring 42 stretched between pins projecting from the pawls 37 and 39 acts to hold the latter with their ends in yielding engagement with the teeth on the ratchet disk 34. The arm or lever 41 is pivoted at one end on a pin 43 mounted on the plate 24 and is formed at its opposite end with a wiper finger 44 arranged to bear on the periphery of the frictional driven disk 29. Formed on the edge of said disk 29 is an inclined projection or tooth 45 adapted to ride under the wiper finger 44 to rock the lever 41 radially away from the axis on which the disk turns and thereby move the lever 41 to an extent sufficient to operate the pawl 39 to advance the ratchet disk 34 one tooth at a time. It will be accordingly apparent that each complete revolution of the disk 29 will cause the ratchet 34 to be advanced through an angular distance equal to the length of one tooth and therefore as many rotations of the disk 29 as there are teeth on the ratchet 34 will be required to turn the latter through a complete revolution. Preferably the ratchet 34 has one hundred teeth on its periphery corresponding to the number of graduations 26 on the face of the dial 25.

Referring now to Fig. 3, there is provided at the left hand side of the casing 12 a lever 46 pivoted intermediate its ends on a pin 47 carried by the plate 24 and being formed adjacent its upper end with a lateral projection or finger 48 adapted to bear on the peripheries of the disks 30 and 35. A wire spring 49 secured at one end in the lever 46 is arranged with its opposite end engaging a pin 50 carried by the plate 24 and acts to force the lever 46 against the peripheries of the disks 30 and 35.

According to the present invention the disk 35 is formed on its periphery with a plurality of notches 51 equally spaced circumferentially thereof and adapted to receive the finger 48 when the disk 34 is turned to bring a notch thereon in alignment with said finger. The plate 30 also has its periphery notched as at 52 and one side of said notch is bevelled as indicated at 53. The lever 46 is only allowed to be rocked by its spring 49 when a notch 51 comes into register or juxtaposition with the notch 52. The purpose of the bevel 53 in the notch 52 is to raise the finger 48 out of the notch 51 as the disk 29 is turned by hand to set the device as hereinafter explained.

The lever 46 which is caused to act at predetermined periods, i. e., when the notches 51 and 52 come into registry, serves as a control means for operating a stop device of the machine to which the indicator is attached. The modus operandi of the stop device will be apparent from Figs. 1 and 3 of the drawing, from which it will be seen that the lower end of the lever 46 carries a depending arm or extension 54 which extends down through an opening 55 in the bottom of the casing 12 at one side of the trough 13. The arm 54 is adapted to be connected with the stopping mechanism of the machine as for example by a detent lever or "dagger" 56 which cooperates with the main stopping lever 57 operated by a spring 58 to shift a driving belt or to throw out a clutch as usually provided, but herein not shown or described. The lever 57 has its end 59 resting against a detent shoulder 60 on the lever 56 to restrain it from movement under the action of its spring 58. Connecting the lever 56 with the arm 54 is a link or rod 61, and it will be understood that when the lever 46 is allowed to rock in the direction indicated by the arrow in Fig. 1, the link 61 will act to throw off the lever 56 to release the lever 57 and thereby cause the operation of the stopping mechanism of the machine.

Adapted to register with the graduations 26 on the dial 25 are a pair of indicating hands 62 and 63 which are carried respectively by the shaft 21 and the bushing 23 and rotated thereby in a counter-clockwise direction. The longer hand 62 is keyed to the reduced end of the shaft 21 and held in place thereon by a nut 64. The shorter hand 63 fits on the outer end of the bushing 23 and is suitably keyed and held in place thereon. The hand 63 is formed with an enlarged circular hub portion to the front of which is secured a ring 66 having a groove in its periphery within which frictionally engages a wire spring 67 having one of its ends bent radially outward to form a pointer or supplementary end 68 which may be set in relation to the hand 63 by moving it clockwise around the ring 66, but when it is turned in a counter-clockwise direction its spring ring 67 acts to bind in the groove so that the hand 63 will be turned with it. The hand 62 at its outer end is provided with a knob and the usual spring plunger pin for the purpose common in devices of this kind. To hold the peripheral portions of the plates in position within the casing a split spring ring 70 having inturned ends 71 engaging in a peripheral groove 72 may be used.

Devices of the kind described are usually made with the measuring wheel 11 having a circumference of one-half yard, the gear 20 with two hundred teeth and the worm 19 with a pitch such that two revolutions of the wheel will advance the gear 20 one tooth so that one complete revolution of the gear will represent four hundred rotations of the wheel 11 or two hundred yards. Now as the hand 62 rotates with the shaft 21 said hand will make one complete revolution about the dial as the gear makes one complete revolution. In making this complete revolution the ratchet wheel will be advanced one tooth and as the ratchet wheel has one hundred teeth corresponding to the one hundred divisions of the dial, the hand 63 which is carried by the bushing which rotates with the ratchet, will be advanced one division on the dial for each complete revolution of the hand 62 and a complete revolution of the hand 63 will represent 20,000 yards of measured off yarn.

Where it is desired to repeatedly measure off equal amounts of yarn and bring the machine to a stop at the end of each measure off I provide a plurality of disks 35 each formed in its periphery with a plurality of notches 51 equally spaced circumferentially around the disk, the angular distance between the notches being governed by the amount of yarn that is to be repeatedly measured off when a particular disk is used. As shown in Fig. 5 the disk 35 has ten notches in its periphery, hence the distance between two adjacent notches will represent 20,000 divided by 10 or two thousand yards. In other words where the disk 35 is used in the device once in in each two thousand yards a notch 51 will come into juxtaposition with the notch 52 in the disk 30 to operate the stop mechanism. To again start the device for measuring off an additional two thousand yards all that is necessary is to move the hand 62 a short distance in a counter-clockwise direction as viewed in Fig. 1 to cause the finger 48 to ride over the bevel 53 of the notch 52 and thereby be disengaged from the notch 51.

Where the device is to be used for repeatedly measuring off any arbitrary yardage, say for example, 5000 yards, a disk having four notches equally spaced about its periphery will be substituted for the disk 35 with the ten notches. Such substitution can be readily accomplished by removing the nut 64 and the split spring ring 70 whereupon the bushing 23 with the various parts mounted thereon including the ratchet wheel 34 and the annular plate 35 can be withdrawn from the shaft. The plate 35 can then be removed by unscrewing the screws 35'' and a disk having four notches therein substituted therefor as described.

I have herein shown my invention as applied to an indicating device, such as is specifically disclosed in the patent to Brink No. 1,286,927, but it will be appreciated that it is equally applicable to any type of measuring device embodying the same principle of operation. Accordingly, I do not wish to be limited to the specific details of construction or the relative relationship of teeth on the gear and ratchet wheel with respect to the indicia on the dial and the circumference of the measuring wheel since these as well as the constructional features may be varied within the range of engineering skill without departing from the spirit of my invention.

What I claim is:

1. A device of the character described comprising a measuring wheel adapted to be rotated by the material to be measured, a gear driven by said measuring wheel, a rotatable shaft about which said gear is rotatable, a disk having a single notch in its periphery fast on said shaft and rotatable therewith, said disk being frictionally driven by the gear, a ratchet wheel rotatable on the same axis as the disk, a second disk of substantially the diameter as the first disk coaxially detachably mounted for rotation with the ratchet wheel, means for advancing the ratchet wheel a fraction of a revolution for each complete revolution of the first disk, said second disk having a plurality of notches in its periphery equally spaced circumferentially thereof, the angular spacing of the notches being determinative of the amount of yarn to be measured as compared with the number of teeth on the gear, the number of teeth on the ratchet wheel and the circumference of the measuring wheel, and a lever having a part riding on the peripheries of the two disks and adapted when the notches therein come into juxtaposition to engage therein, the movement of said lever functioning to operate a mechanism to stop the machine to which the device is attached.

2. A yarn measuring device of the character described comprising a ratchet wheel and a disk coaxially detachably mounted on the ratchet wheel to be rotatable therewith, separable connecting means providing for such detachable connection, said disk having a plurality of notches in its periphery equally spaced circumferentially therearound.

MORRIS WOLKIN.